(12) United States Patent
Shi et al.

(10) Patent No.: US 10,491,450 B2
(45) Date of Patent: Nov. 26, 2019

(54) METHOD, APPARATUS, AND SYSTEM FOR CONTROLLING SENDING OF MAC ADDRESS FORWARDING TABLE

(71) Applicant: Huawei Technologies Co., Ltd., Shenzhen (CN)

(72) Inventors: Tijun Shi, Nanjing (CN); Peilin Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 15/638,085

(22) Filed: Jun. 29, 2017

(65) Prior Publication Data

US 2017/0302501 A1  Oct. 19, 2017

Related U.S. Application Data

(63) Continuation of application No. PCT/CN2015/098223, filed on Dec. 22, 2015.

(30) Foreign Application Priority Data

Dec. 31, 2014  (CN) .......................... 2014 1 0856326

(51) Int. Cl.
*H04L 29/12* (2006.01)
*H04L 12/741* (2013.01)
*H04L 12/46* (2006.01)

(52) U.S. Cl.
CPC ........ *H04L 29/12009* (2013.01); *H04L 45/74* (2013.01); *H04L 45/745* (2013.01);
(Continued)

(58) Field of Classification Search
CPC . H04L 29/12009; H04L 45/74; H04L 45/745; H04L 61/00; H04L 61/10;
(Continued)

(56) References Cited

U.S. PATENT DOCUMENTS 9,838,337 B1 * 12/2017 Pinnamraju ............. H04L 49/25
2014/0112122 A1   4/2014 Kapadia et al.
(Continued)

FOREIGN PATENT DOCUMENTS

CN     103905577 A     7/2014
CN     104115453 A    10/2014
(Continued)

OTHER PUBLICATIONS

Sajassi, A. et al., "Integrated Routing and Bridging in EVPN; draft-ietf-bess-evpn-inter-subnet-forwarding-00.txt," Internet Engineering Task Force (IETF), Nov. 11, 2014, 26 pages.

*Primary Examiner* — Paul H Masur
(74) *Attorney, Agent, or Firm* — Slater Matsil, LLP

(57) ABSTRACT

A method, an apparatus, and a system for controlling sending of a MAC address forwarding table are provided. In the solution, when it is determined that a destination IP address is different from any IP address of a gateway to which a source virtual machine is attached, generation, according to an ARP request packet, a first MAC address forwarding table that is to be sent to the gateway is forbidden; and when it is determined that IP addresses of the gateway to which the source virtual machine is attached include an IP address that is the same as the destination IP address, a first MAC address forwarding table that is to be sent to the gateway is generated according to the ARP request packet, and the first MAC address forwarding table is sent to the gateway.

13 Claims, 5 Drawing Sheets

(52) U.S. Cl.
CPC .......... *H04L 61/10* (2013.01); *H04L 12/4641* (2013.01); *H04L 61/00* (2013.01)

(58) Field of Classification Search
CPC ... H04L 12/4641; H04L 41/08; H04L 49/351; H04L 49/70; H04L 12/66
See application file for complete search history.

(56) References Cited

U.S. PATENT DOCUMENTS

| | | | |
|---|---|---|---|
| 2014/0146817 A1 | 5/2014 | Zhang | |
| 2015/0009992 A1* | 1/2015 | Zhang | H04L 49/354 370/392 |
| 2015/0281067 A1 | 10/2015 | Wu | |
| 2016/0094366 A1* | 3/2016 | Wang | H04L 12/4625 370/401 |
| 2016/0212067 A1 | 7/2016 | Wu | |
| 2017/0228251 A1* | 8/2017 | Yang | H04L 12/4633 |
| 2017/0310586 A1* | 10/2017 | Lin | H04L 12/6418 |

FOREIGN PATENT DOCUMENTS

| | | |
|---|---|---|
| JP | 2013078087 A | 4/2013 |
| WO | 2013177289 A1 | 11/2013 |

* cited by examiner

METHOD, APPARATUS, AND SYSTEM FOR CONTROLLING SENDING OF MAC ADDRESS FORWARDING TABLE

CROSS-REFERENCE TO RELATED APPLICATIONS

This application is a continuation of International Application No. PCT/CN2015/098223, filed on Dec. 22, 2015, which claims priority to Chinese Patent Application No. 201410856326.4, filed on Dec. 31, 2014. The disclosures of the aforementioned applications are hereby incorporated by reference in their entireties.

TECHNICAL FIELD

The present invention relates to the field of communications technologies, and in particular, to a method, an apparatus, and a system for controlling sending of a media access control (MAC) address forwarding table.

BACKGROUND

With development of circuit switching, communications networks meet requirements of placing calls and performing digital program control by people, and are a protocol system that is complete from a physical layer to an application layer, and desirably supports coordination between networks and applications, for example, sensing of a fault at a bottom layer by an upper layer, and cooperation of upper-layer flow control and a network status.

As packet switching networks, especially, Internet Protocol (IP) networks emerge, a condition for internetworking and reusing of network resources is provided. With development of science and technologies, software-defined networking (SDN) derives based on an IP network. The SDN is a new network architecture, and a core technology of the SDN is separating a control plane from a data plane of a network device, thereby implementing flexible control of network traffic, and providing a desirable platform for innovation of core networks and applications.

In a data center network, data flows of different tenants need to be isolated by using different virtual local area networks (vVLAN). However, there are only 4094 conventional VLANs, which cannot meet isolation requirements of over 4K tenants. In this case, a virtual extensible local area network (VXLAN) technology is invented. The VXLAN technology enables multiple virtual machines (VM) in a same VXLAN to perform communication across three-layer networks, which can effectively break through a limitation of 4K tenants in a conventional VLAN. Therefore, the VXLAN technology is applied more widely.

In the prior art, when the VXLAN technology is used for communication in an SDN network architecture, an SDN controller delivers, after creating a VM, a MAC address forwarding table of the VM to a VXLAN gateway to which the VM belongs. There may be multiple VMs in a VXLAN gateway, and in this case, the VXLAN gateway needs to store a large number of MAC address forwarding tables, but a MAC address forwarding table of each VM is not needed all the time. Therefore, a disadvantage of relatively severe waste of resources exists in current VXLAN gateways.

SUMMARY

Embodiments of the present invention provide a method, an apparatus, and a system for controlling sending of a MAC address forwarding table, so as to resolve a disadvantage of relatively severe waste of storage resources in a VXLAN gateway in the prior art.

Specific technical solutions provided in the embodiments of the present invention are as follows.

According to a first aspect, a method for controlling sending of a MAC address forwarding table is provided. The method includes receiving, by an SDN controller, an address resolution protocol (ARP) request packet sent by a source virtual machine by using a first top-of-rack (TOR) switch to which the source virtual machine is attached, where the ARP request packet carries a destination IP address. The method also includes, when the SDN controller determines that the destination IP address is different from any IP address of a gateway to which the source virtual machine is attached, forbidding generation, according to the ARP request packet, of a first MAC address forwarding table that is to be sent to the gateway to which the source virtual machine is attached.

With reference to the first aspect, in a first possible implementation manner, after the receiving, by an SDN controller, an ARP request packet, the method further includes: determining, by the SDN controller, that a tunnel in which the source virtual machine interacts with a destination virtual machine corresponding to the destination IP address is a first tunnel between the first TOR switch and a second TOR switch to which the destination virtual machine is attached; and returning, by the SDN controller, a second MAC address forwarding table to the first TOR switch, where the second MAC address forwarding table carries a mapping relationship between a MAC address of the destination virtual machine and the first tunnel.

With reference to the first aspect, in a second possible implementation manner, after the receiving, by an SDN controller, an ARP request packet, the method further includes: when the SDN controller determines that IP addresses of the gateway to which the source virtual machine is attached include an IP address that is the same as the destination IP address, determining that a tunnel in which the source virtual machine interacts with a destination virtual machine corresponding to the destination IP address is a second tunnel between the first TOR switch and the gateway; generating, by the SDN controller, a first MAC address forwarding table according to the ARP request packet, where the first MAC address forwarding table includes a mapping relationship between a MAC address of the source virtual machine and the second tunnel; and sending, by the SDN controller, the generated first MAC address forwarding table to the gateway.

With reference to the second possible implementation manner of the first aspect, in a third possible implementation manner, when the SDN controller determines that IP addresses of the gateway to which the source virtual machine is attached include an IP address that is the same as the destination IP address, the method further includes: returning, by the SDN controller, a second MAC address forwarding table to the first TOR switch, where the second MAC address forwarding table carries a mapping relationship between a MAC address of the gateway and the second tunnel.

According to a second aspect, an SDN controller is provided. The SDN controller includes a receiving unit, configured to receive an ARP request packet sent by a source virtual machine by using a first TOR switch to which the source virtual machine is attached, where the ARP request packet carries a destination IP address. The SDN controller also includes a determining unit, configured to: when determining that the destination IP address is different from any IP address of a gateway to which the source virtual machine is attached, forbid generation, according to the ARP request packet, of a first MAC address forwarding table that is to be sent to the gateway to which the source virtual machine is attached.

With reference to the second aspect, in a first possible implementation manner, the SDN controller further includes a first determining unit and a first sending unit, where the first determining unit is configured to determine that a tunnel in which the source virtual machine interacts with a destination virtual machine corresponding to the destination IP address is a second tunnel between the first TOR switch and the gateway; and the first sending unit is configured to return a second MAC address forwarding table to the first TOR switch, where the second MAC address forwarding table carries a mapping relationship between a MAC address of the destination virtual machine and the first tunnel.

With reference to the second aspect, in a second possible implementation manner, the SDN controller further includes a second determining unit, configured to: when the determining unit determines that IP addresses of the gateway to which the source virtual machine is attached include an IP address that is the same as the destination IP address, determine that a tunnel in which the source virtual machine interacts with a destination virtual machine corresponding to the destination IP address is a second tunnel between the first TOR switch and the gateway; and generate a first MAC address forwarding table according to the ARP request packet, where the first MAC address forwarding table includes a mapping relationship between a MAC address of the source virtual machine and the second tunnel. The SDN controller further includes a second sending unit, configured to send the generated first MAC address forwarding table to the gateway.

With reference to the second possible implementation manner of the second aspect, in a third possible implementation manner, the second sending unit is further configured to return a second MAC address forwarding table to the first TOR switch, where the second MAC address forwarding table carries a mapping relationship between a MAC address of the gateway and the second tunnel.

According to a third aspect, an SDN control system is provided, including the SDN controller in the second aspect or the first possible implementation manner to the third possible implementation manner of the second aspect.

In the prior art, MAC address forwarding tables of all VMs in a VXLAN gateway are stored in the gateway at any time, which results in relatively severe waste of resources. In the embodiments of the present invention, an ARP request packet sent by a source virtual machine by using a first TOR switch to which the source virtual machine is attached is received, where the ARP request packet carries a destination IP address; and when it is determined that the destination IP address is different from any IP address of a gateway to which the source virtual machine is attached, generation, according to the ARP request packet, of a first MAC address forwarding table that is to be sent to the gateway is forbidden. In this way, when it is determined that the gateway to which the source virtual machine is attached does not need to use the first MAC address forwarding table, there is no need to deliver the first MAC address forwarding table to the gateway to which the source virtual machine is attached, thereby improving utilization of storage resources of the gateway to which the source virtual machine is attached.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. A "gateway" mentioned in embodiments of the present invention may be a common gateway or a VXLAN gateway.

In the following, preferred implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined in a case in which they do not conflict with each other.

The preferred implementation manners of the present invention are described below in detail with reference to the accompanying drawings.

Embodiment 1

Figure 1:
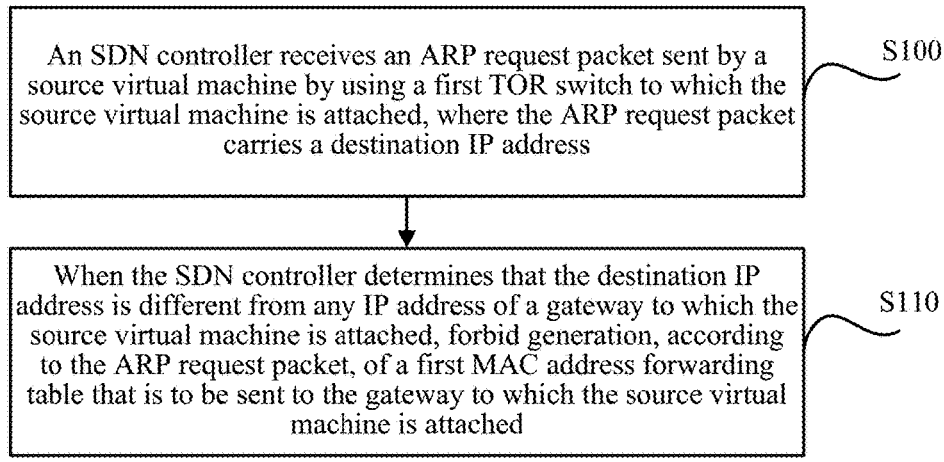
FIG. 1 is a flowchart of controlling sending of a MAC address forwarding table according to an embodiment of the present invention.

Referring to FIG. 1, in this embodiment of the present invention, a method for controlling sending of a MAC address forwarding table includes the following steps.

S100: An SDN controller receives an ARP request packet sent by a source virtual machine by using a first TOR switch to which the source virtual machine is attached, where the ARP request packet carries a destination IP address.

S110: When the SDN controller determines that the destination IP address is different from any IP address of a gateway to which the source virtual machine is attached, forbid generation, according to the ARP request packet, of a first MAC address forwarding table that is to be sent to the gateway to which the source virtual machine is attached.

Optionally, the gateway in this embodiment may be a VXLAN gateway.

Figure 2A:
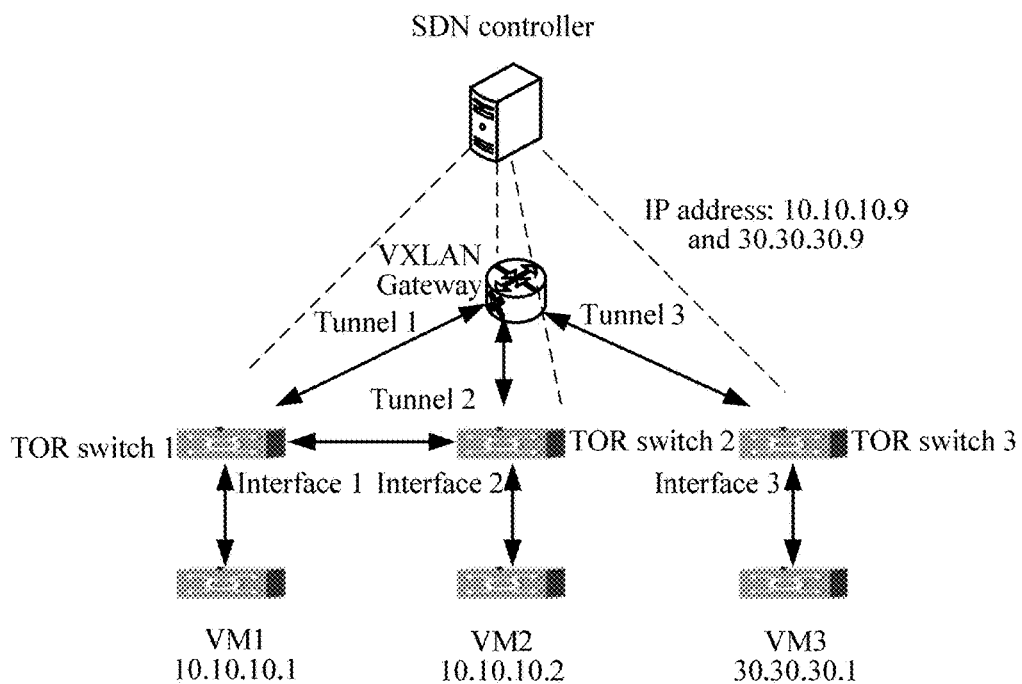
FIG. 2A is a schematic diagram of an SDN network architecture according to an embodiment of the present invention.

Optionally, this embodiment may be based on an SDN network architecture shown in FIG. 2A.

In this embodiment of the present invention, optionally, after the source virtual machine sends the ARP request packet, the first TOR switch obtains the ARP request packet and sends the ARP request packet according to an OpenFlow protocol.

In actual application, regardless of whether the source virtual machine and a destination virtual machine belong to a same network segment, interaction between the source virtual machine and the destination virtual machine needs to be performed by using the first TOR switch. Therefore, the first TOR switch also needs to obtain a MAC address forwarding table. Therefore, in this embodiment of the present invention, further, after the receiving, by an SDN controller, an ARP request packet, the method for controlling sending of a MAC address forwarding table may further include: determining, by the SDN controller, that a tunnel in which the source virtual machine interacts with a destination virtual machine is a first tunnel between the first TOR switch and a second TOR switch to which the destination virtual machine corresponding to the destination IP address is attached; and returning, by the SDN controller, a second MAC address forwarding table to the first TOR switch, where the second MAC address forwarding table carries a mapping relationship between the destination virtual machine and the first tunnel.

Therefore, the first TOR switch may forward, when receiving a data packet sent by the source virtual machine, the data packet according to the second MAC address forwarding table.

In this embodiment of the present invention, the SDN controller stores a network topology of all gateways, all TOR switches, and all virtual machines that are controlled by the SDN controller. Optionally, when determining a first tunnel, the SDN controller determines the first tunnel according to a topological relationship that is in the stored network topology and that is between a TOR switch connected to the source virtual machine and a TOR switch connected to the destination virtual machine.

For example, there are one gateway and two TOR switches, namely, a TOR switch 1 and a TOR switch 2, under an SDN controller. The TOR switch 1 is connected to a virtual machine 1, the TOR switch 2 is connected to a virtual machine 2, a tunnel 1 exists between the gateway and the TOR switch 1, a tunnel 2 exists between the gateway and the TOR switch 2, and a tunnel 3 exists between the TOR switch 1 and the TOR switch 2. The foregoing network topology exists under the SDN controller, and the SDN controller determines, according to a network topology between the TOR switch 1 and the TOR switch 2 when determining a tunnel in which the virtual machine 1 interacts with the virtual machine 2 that belongs to a same network segment as the virtual machine 1, that the tunnel is the tunnel 3 between the TOR switch 1 and the TOR switch 2.

The foregoing describes a case in which there is only one tunnel between the TOR switch 1 and the TOR switch 2. In actual application, there may be multiple tunnels between the TOR switch 1 and the TOR switch 2. In this case, any tunnel between the TOR switch 1 and the TOR switch 2 may be selected as a tunnel in which the virtual machine 1 interacts with the virtual machine 2 that belongs to a same network segment as the virtual machine 1, and details are not described herein again.

The foregoing describes a case in which the destination IP address is different from any IP address of the gateway to which the source virtual machine belongs. In actual application, IP addresses of the gateway to which the source virtual machine belongs may have an IP address that is the same as the destination IP address carried in the ARP request packet. That is, the source virtual machine and the destination virtual machine belong to a same network segment. In this case, the following operation needs to be operated. For example, after the receiving, by an SDN controller, an ARP request packet, the method may further include: when the SDN controller determines that IP addresses of the gateway to which the source virtual machine is attached include an IP address that is the same as the destination IP address, determining that a tunnel in which the source virtual machine interacts with a destination virtual machine corresponding to the destination IP address is a second tunnel between the first TOR switch and the gateway; generating, by the SDN controller, a first MAC address forwarding table according to the ARP request packet, where the first MAC address forwarding table includes a mapping relationship between a MAC address of the source virtual machine and the second tunnel; and sending, by the SDN controller, the generated first MAC address forwarding table to the gateway.

In this way, after receiving a data packet sent by the source virtual machine, the gateway broadcasts the data packet to the destination virtual machine. Because the data packet carries an IP address of the destination virtual machine, after receiving the data packet, the destination virtual machine returns a response packet to the source virtual machine. After receiving the response packet of the destination virtual machine, the gateway may send a response packet to the source virtual machine according to the first MAC address forwarding table.

In this embodiment of the present invention, a second MAC address forwarding table also needs to be sent to the first TOR switch. In a specific implementation process, the following manner may be used. For example, when the SDN controller determines that IP addresses of the gateway to which the source virtual machine is attached include an IP address that is the same as the destination IP address carried in the ARP request packet, the method may further include: returning, by the SDN controller, a second MAC address forwarding table to the first TOR switch, where the second MAC address forwarding table carries a mapping relationship between a MAC address of the gateway and the second tunnel.

Optionally, same as determining of the first tunnel, to determine a second tunnel, the SDN controller may determine the second tunnel according to a topological relationship that is in the stored network topology and that is between a TOR switch connected to the source virtual machine and a gateway.

For example, there are one gateway and two TOR switches, namely, a TOR switch 1 and a TOR switch 2, under an SDN controller. The TOR switch 1 is connected to a virtual machine 1, the TOR switch 2 is connected to a virtual machine 2, a tunnel 1 exists between the gateway and the TOR switch 1, a tunnel 2 exists between the gateway and the TOR switch 2, and a tunnel 3 exists between the TOR switch 1 and the TOR switch 2. The foregoing network topology exists under the SDN controller, and the SDN controller determines, according to a network topology between the TOR switch 1 and the gateway when determining a tunnel in which the virtual machine 1 interacts with the virtual machine 2 that belongs to a different network segment from the virtual machine 1, that the tunnel is the tunnel 1 between the TOR switch 1 and the gateway.

The foregoing describes a case in which there is only one tunnel between the TOR switch 1 and the gateway. In actual application, there may be multiple tunnels between the TOR switch 1 and the gateway. In this case, any tunnel between the TOR switch 1 and the gateway may be selected as a tunnel in which the virtual machine 1 interacts with the virtual machine 2 that belongs to a different network segment from the virtual machine 1, and details are not described herein again.

That is, when the IP address of the source virtual machine and the IP address of the destination virtual machine belong to a same network segment, or belong to different network segments, a second MAC address forwarding table needs to be returned to the first TOR switch. When the IP address of the source virtual machine and the IP address of the destination virtual machine belong to a same network segment, or different network segments, content carried in the second MAC address forwarding table is different. When the IP address of the source virtual machine and the IP address of the destination virtual machine belong to a same network segment, the second MAC address forwarding table carries a mapping relationship between a MAC address of the destination virtual machine and the first tunnel; and when the IP address of the source virtual machine and the IP address of the destination virtual machine belong to different network segments, the second MAC address forwarding table carries a mapping relationship between a MAC address of the gateway and the second tunnel.

Optionally, in this embodiment of the present invention, regardless of whether the IP address of the source virtual machine and the IP address of the destination virtual machine belong to a same network segment or not, after the receiving, by an SDN controller, an ARP request packet, the method may further include: returning an ARP response packet to the source virtual machine by using the first TOR switch.

Optionally, in this embodiment of the present invention, the ARP response packet includes a destination MAC address. If the IP address of the source virtual machine and the IP address of the destination virtual machine belong to a same network segment, the destination MAC address is a MAC address of the destination virtual machine; or if the IP address of the source virtual machine and the IP address of the destination virtual machine belong to different network segments, the destination MAC address is a MAC address of the gateway.

When the source virtual machine and the destination virtual machine belong to different network segments, destination MAC addresses carried in the data packet are different, but IP addresses carried in the data packet are all IP addresses of the destination virtual machine.

That is, when the source virtual machine and the destination virtual machine belong to a same network segment, a destination IP carried in the data packet sent by the source virtual machine is an IP address of the destination virtual machine, a destination MAC address carried in the data packet is a MAC address of the destination virtual machine; and when the source virtual machine and the destination virtual machine belong to different network segments, the destination IP carried in the data packet sent by the source virtual machine is an IP address of the destination virtual machine, and a destination MAC address carried in the data packet is a MAC address of the gateway.

In this embodiment of the present invention, the ARP request packet may further carry a MAC address of the source virtual machine and an IP address of the source virtual machine, so that the gateway or the destination virtual machine learns a mapping relationship between the MAC address of the source virtual machine and the IP address.

To sum up, in this embodiment of the present invention, when it is determined that a destination IP address is different from any IP address of a gateway to which a source virtual machine is attached, generation, according to an ARP request packet, of a first MAC address forwarding table that is to be sent to the gateway is forbidden; and when it is determined that IP addresses of the gateway to which the source virtual machine is attached include an IP address that is the same as the destination IP address, the first MAC address forwarding table that is to be sent to the gateway is generated according to the ARP request packet, and the first MAC address forwarding table is sent to the gateway. Therefore, when it is determined that the gateway to which the source virtual machine is attached does not need to use the first MAC address forwarding table, there is no need to deliver the first MAC address forwarding table to the gateway to which the source virtual machine is attached, thereby improving utilization of storage resources of the gateway to which the source virtual machine is attached.

To better understand this embodiment of the present invention, the following provides a specific application scenario, and detailed description is further performed on a process of controlling sending of a MAC address forwarding table. In this embodiment of the present invention, the method for controlling sending of a MAC address forwarding table is based on an SDN network architecture shown in FIG. 2A. In FIG. 2A, an IP address of a VM1 is 10.10.10.1, and the VM1 communicates with a TOR switch 1 through an interface 1 of the TOR switch 1. An IP address of a VM2 is 10.10.10.2, and the VM2 communicates with a TOR switch 2 through an interface 2 of the TOR switch 2. An IP address of a VM3 is 30.30.30.1, and the VM3 communicates with a TOR switch 3 through an interface 3 of the TOR switch 3. That is, the IP address of the VM1, the IP address of the VM2, and one IP address 10.10.10.9 of the VXLAN gateway are in a same network segment, the IP address of the VM3 and one IP address 30.30.30.9 in the VXLAN gateway are in a same network segment, and the IP address of the VM3, the IP address of the VM1, and the IP address of the VM2 are in different network segments. The TOR switch 1 communicates with the VXLAN gateway through a tunnel 1, and the TOR switch 1 communicates with the TOR switch 2 through a tunnel 2. The VXLAN gateway may include multiple IP addresses, for example, the VXLAN gateway may include two IP addresses: 10.10.10.9 and 30.30.30.9. The VM1 communicates with the VXLAN gateway through the TOR switch 1. The SDN controller controls a communication process including the VXLAN gateway, the VM1, the VM2, the VM3, the TOR switch 1, the TOR switch 2, and the TOR switch 3.

Figure 2B:
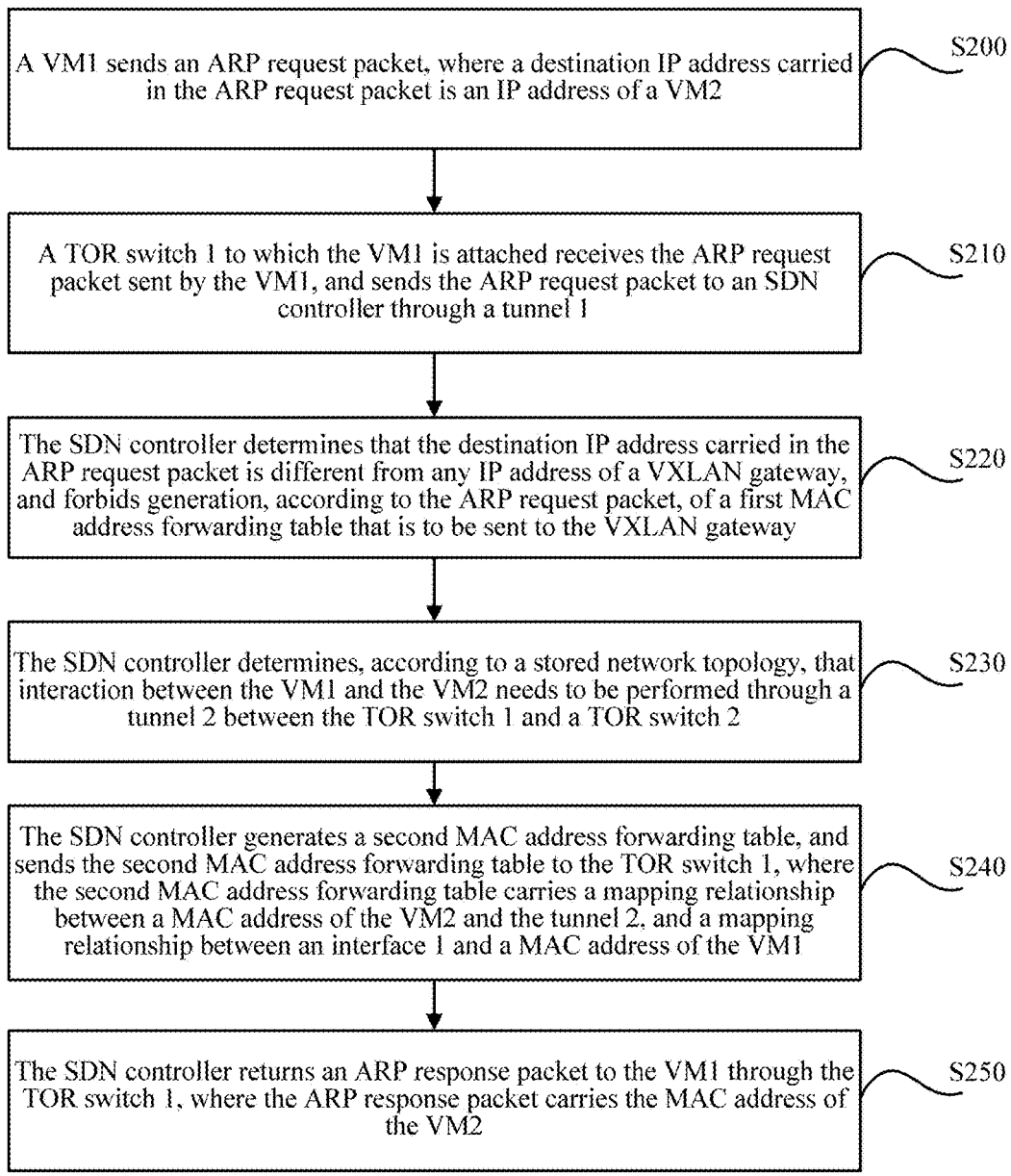
FIG. 2B shows an embodiment of controlling sending of a MAC address forwarding table according to an embodiment of the present invention.

In this embodiment of the present invention, the method for controlling sending of a MAC address forwarding table is shown in FIG. 2B. The method includes the following steps.

S200: A VM1 sends an ARP request packet, where a destination IP address carried in the ARP request packet is an IP address of a VM2.

S210: A TOR switch 1 to which the VM1 is attached receives the ARP request packet sent by the VM1, and sends the ARP request packet to an SDN controller through a tunnel 1.

S220: The SDN controller determines that the destination IP address carried in the ARP request packet is different from any IP address of a VXLAN gateway, and forbids generation, according to the ARP request packet, of a first MAC address forwarding table that is to be sent to the VXLAN gateway.

S230: The SDN controller determines, according to a stored network topology, that interaction between the VM1 and the VM2 needs to be performed through a tunnel 2 between the TOR switch 1 and a TOR switch 2.

S240: The SDN controller generates a second MAC address forwarding table, and sends the second MAC address forwarding table to the TOR switch 1, where the second MAC address forwarding table carries a mapping relationship between a MAC address of the VM2 and the tunnel 2, and a mapping relationship between an interface 1 and a MAC address of the VM1.

S250: The SDN controller returns an ARP response packet to the VM1 through the TOR switch 1, where the ARP response packet carries the MAC address of the VM2.

In this embodiment, the second MAC address forwarding table is shown in Table 1:

TABLE 1

| Second MAC address forwarding table in the TOR switch 1 | |
|---|---|
| MAC address | MAC egress information |
| VM1 | Interface 1 |
| VM2 | Tunnel 2 |

The foregoing describes a process of controlling sending of a MAC address table by the SDN controller when the VM1 is a source virtual machine, the VM2 is a destination virtual machine, and the VM1 and the VM2 perform communication according to the scenario of a network architecture diagram in FIG. 2A. However, in application, there may be a case in which the VM2 is a source virtual machine, and the VM1 is a destination virtual machine. In this case, the SDN controller delivers a third MAC address forwarding table to the TOR switch 2. As shown in Table 2, the third MAC address forwarding table includes the mapping relationship between the MAC address of the VM1 and the tunnel 2, and the mapping relationship between the MAC address of the VM2 and the interface 2.

TABLE 2

| Third MAC address forwarding table in the TOR switch 2 | |
|---|---|
| MAC address | MAC egress information |
| VM1 | Tunnel 2 |
| VM2 | Interface 2 |

Embodiment 3

Embodiment 2 describes a case in which the destination IP address is different from the IP address of the VXLAN gateway. In actual application, the destination IP address may be the same as a particular IP address of the VXLAN gateway. The foregoing makes description by using Embodiment 3.

To better understand this embodiment of the present invention, the following shows a specific application scenario, and detailed description is further made on a process of controlling sending of a MAC address forwarding table.

In this embodiment of the present invention, the method for controlling sending of a MAC address forwarding table is based on an SDN network architecture shown in FIG. 2A.

Figure 3:
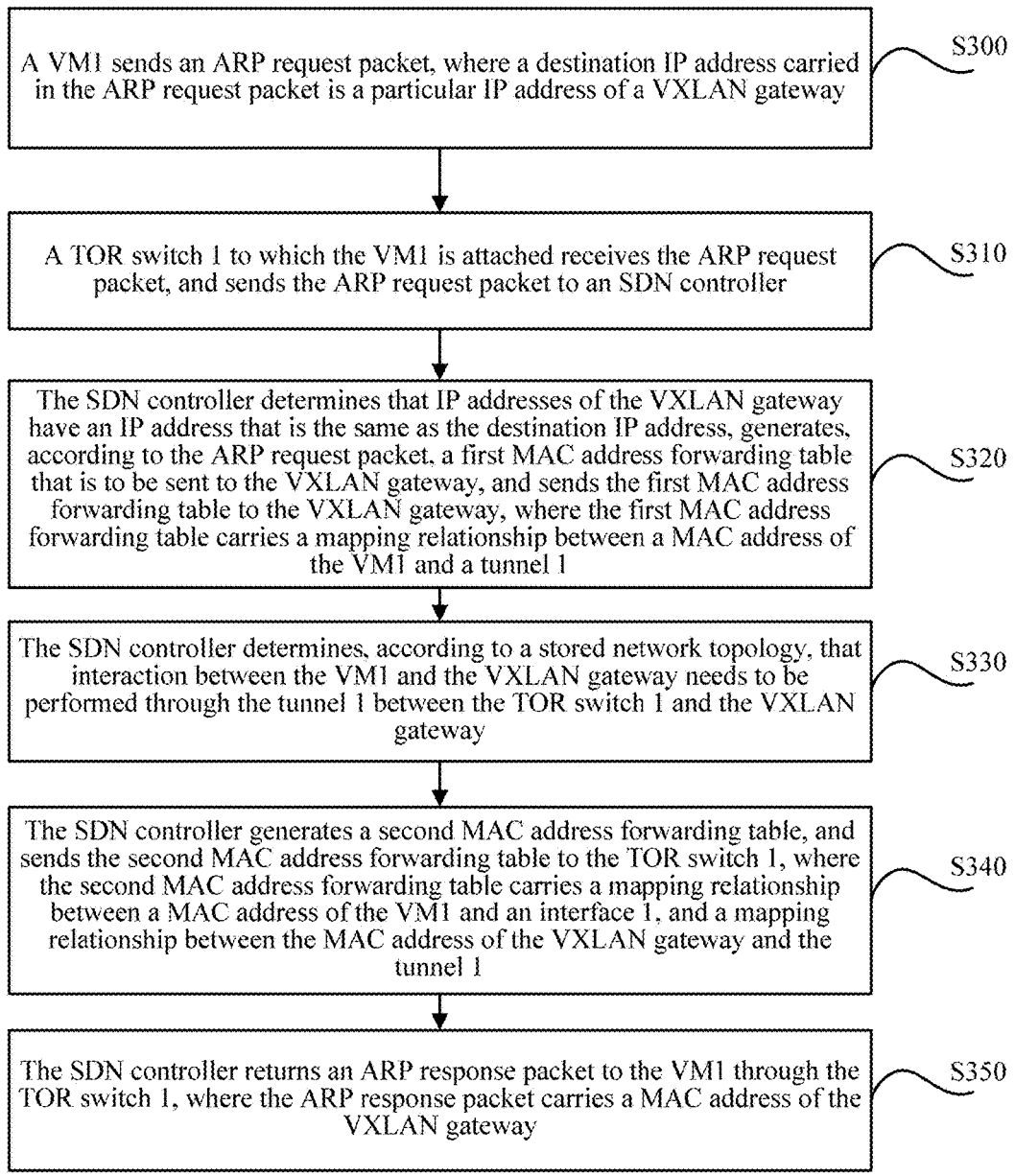
FIG. 3 shows another embodiment of controlling sending of a MAC address forwarding table according to an embodiment of the present invention.

In this embodiment of the present invention, the method for controlling sending of a MAC address forwarding table is shown in FIG. 3. The method includes the following steps.

S300: A VM1 sends an ARP request packet, where a destination IP address carried in the ARP request packet is a particular IP address of a VXLAN gateway.

S310: A TOR switch 1 to which the VM1 is attached receives the ARP request packet, and sends the ARP request packet to an SDN controller.

S320: The SDN controller determines that IP addresses of the VXLAN gateway have an IP address that is the same as the destination IP address, generates, according to the ARP request packet, a first MAC address forwarding table that is to be sent to the VXLAN gateway, and sends the first MAC address forwarding table to the VXLAN gateway, where the first MAC address forwarding table carries a mapping relationship between a MAC address of the VM1 and a tunnel 1.

S330: The SDN controller determines, according to a stored network topology, that interaction between the VM1 and the VXLAN gateway needs to be performed through the tunnel 1 between the TOR switch 1 and the VXLAN gateway.

S340: The SDN controller generates a second MAC address forwarding table, and sends the second MAC address forwarding table to the TOR switch 1, where the second MAC address forwarding table carries a mapping relationship between a MAC address of the VM1 and an interface 1, and a mapping relationship between the MAC address of the VXLAN gateway and the tunnel 1.

S350: The SDN controller returns an ARP response packet to the VM1 through the TOR switch 1, where the ARP response packet carries a MAC address of the VXLAN gateway.

In Embodiment 3, as shown in FIG. 3, the first MAC address forwarding table includes the mapping relationship between the MAC address of the VM1 and the tunnel 1. As shown in FIG. 4, the second MAC address forwarding table includes the mapping relationship between the MAC address of the VM1 and the interface 1, and the mapping relationship between the MAC address of the VXLAN gateway and the tunnel 1.

TABLE 3

| First MAC address forwarding table in the VXLAN gateway | |
|---|---|
| MAC address | MAC egress information |
| VM1 | Tunnel 1 |

TABLE 4

| Second MAC address forwarding table in the TOR switch 1 | |
|---|---|
| MAC address | MAC egress information |
| VM1 | Interface 1 |
| VXLAN network | Tunnel 1 |

Figure 5:
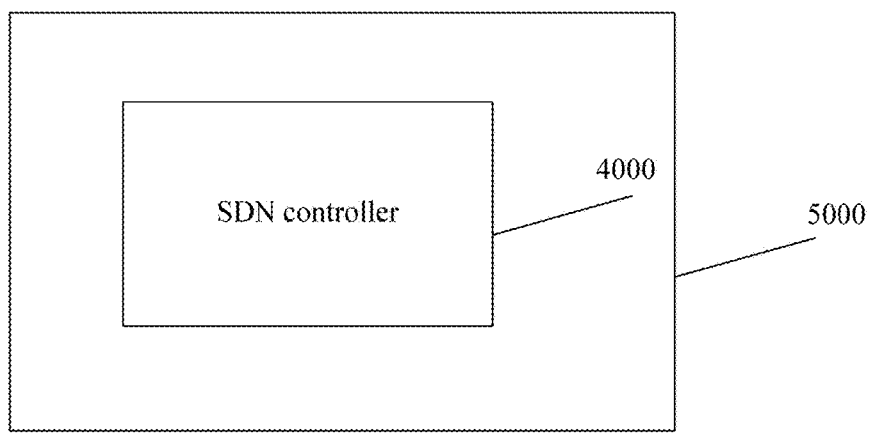
FIG. 5 is a schematic structural diagram of an SDN control system according to an embodiment of the present invention.

The foregoing describes a case in which the VM1 is the source virtual machine, and the VM3 is the destination virtual machine, as in the SDN network architecture shown in FIG. 2A. However, in application, there may be a case in which the VM3 is a source virtual machine and the VM1 is a destination virtual machine. In this case, the SDN controller delivers a fourth MAC address forwarding table to the TOR switch 3. As shown in FIG. 5, the fourth MAC address forwarding table includes a mapping relationship between the MAC address of the VM1 and a tunnel 3, and a mapping relationship between a MAC address of the VM3 and an interface 3. The tunnel 3 is a tunnel for communication between the TOR switch 3 and the TOR switch 1, and the interface 3 is an interface for communication between the TOR switch 3 and the VM3.

TABLE 5

Fourth MAC address forwarding table in the TOR switch 3

| MAC address | MAC egress information |
|---|---|
| VM1 | Tunnel 3 |
| VM3 | Interface 3 |

Figure 4A:
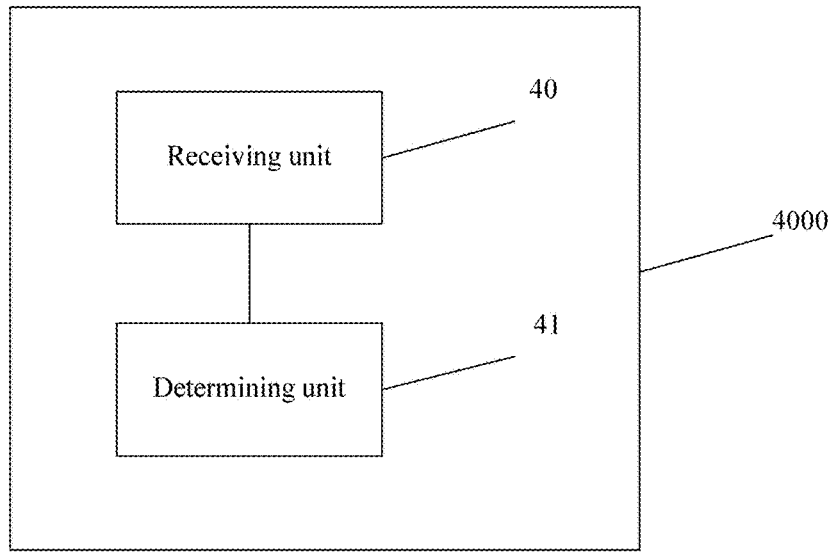
FIG. 4A is a schematic structural diagram of an SDN controller according to an embodiment of the present invention.

On the basis of the technical solutions corresponding to the foregoing method, referring to FIG. 4A, an embodiment of the present invention provides an SDN controller 4000, and the SDN controller 4000 includes a receiving unit 40 and a determining unit 41.

The receiving unit 40 is configured to receive an ARP request packet sent by a source virtual machine by using a first TOR switch to which the source virtual machine is attached, where the ARP request packet carries a destination IP address.

The determining unit 41 is configured to: when determining that the destination IP address is different from any IP address of a gateway to which the source virtual machine is attached, forbid generation, according to the ARP request packet, of a first MAC address forwarding table that is to be sent to the gateway to which the source virtual machine is attached.

In this embodiment of the present invention, further, the SDN controller 4000 further includes a first determining unit and a first sending unit. The first determining unit is configured to determine that a tunnel in which the source virtual machine interacts with a destination virtual machine corresponding to the destination IP address is a first tunnel between the first TOR switch and the second TOR switch to which the destination virtual machine is attached.

The first sending unit is configured to return a second MAC address forwarding table to the first TOR switch, where the second MAC address forwarding table carries a mapping relationship between a MAC address of the destination virtual machine and the first tunnel.

In this embodiment of the present invention, further, the SDN controller 4000 further includes a second determining unit, configured to determine, when the determining unit 41 determines that IP addresses of the gateway to which the source virtual machine is attached include an IP address that is the same as the destination IP address, that a tunnel in which the source virtual machine interacts with a destination virtual machine corresponding to the destination IP address is a second tunnel between the first TOR switch and the gateway; and generate a first MAC address forwarding table according to the ARP request packet, where the first MAC address forwarding table includes a mapping relationship between a MAC address of the source virtual machine and the second tunnel.

The SDN controller 4000 further includes a second sending unit, configured to send the generated first MAC address forwarding table to the gateway.

In this embodiment of the present invention, further, the second sending unit is further configured to return a second MAC address forwarding table to the first TOR switch, where the second MAC address forwarding table carries a mapping relationship between the gateway and the second tunnel.

Figure 4B:
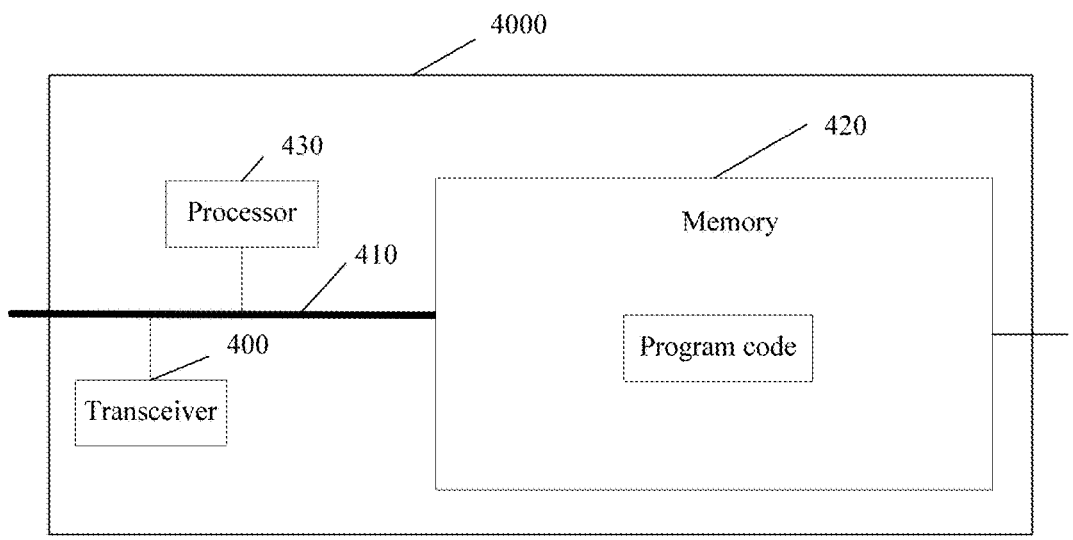
FIG. 4B is another schematic structural diagram of an SDN controller according to an embodiment of the present invention.

FIG. 4B is another schematic structural diagram of an SDN controller 4000 according to this embodiment of the present invention. The SDN controller 4000 includes a transceiver 400, a communications bus 410, a memory 420, and a processor 430.

The transceiver 400 is configured to receive an ARP request packet sent by a source virtual machine by using a TOR switch to which the source virtual machine is attached, where the ARP request packet carries a destination IP address.

The communications bus 410 is used for connection and communication between the processor 430, the transceiver 400, and the memory 420.

The memory 420 is configured to store program code.

The processor 430 is configured to invoke the program code stored in the memory 420 and execute the following operations: when it is determined that the destination IP address is different from any IP address of a gateway to which the source virtual machine is attached, forbidding generation, according to the ARP request packet, of a first MAC address forwarding table that is to be sent to the gateway to which the source virtual machine is attached.

In this embodiment of the present invention, further, the processor 430 is further configured to determine that a tunnel in which the source virtual machine interacts with a destination virtual machine corresponding to the destination IP address is a first tunnel between the first TOR switch and the second TOR switch to which the destination virtual machine is attached.

The transceiver 400 is further configured to return a second MAC address forwarding table to the first TOR switch, where the second MAC address forwarding table carries a mapping relationship between a MAC address of the destination virtual machine and the first tunnel.

In this embodiment of the present invention, further, the processor 430 is further configured to: when determining that IP addresses of the gateway to which the source virtual machine is attached include an IP address that is the same as the destination IP address, determine that a tunnel in which the source virtual machine interacts with a destination virtual machine corresponding to the destination IP address is a second tunnel between the first TOR switch and the gateway; and generate a first MAC address forwarding table according to the ARP request packet, where the first MAC address forwarding table includes a mapping relationship between a MAC address of the source virtual machine and the second tunnel.

The transceiver 400 is further configured to send the generated first MAC address forwarding table to the gateway.

In this embodiment of the present invention, further, the transceiver 400 is further configured to return a second MAC address forwarding table to the first TOR switch, where the second MAC address forwarding table carries a mapping relationship between a MAC address of the gateway and the second tunnel.

On the basis of the technical solutions corresponding to the foregoing method, referring to FIG. 5, an embodiment of the present invention provides an SDN control system 5000. The system includes the SDN controller shown in FIG. 4A or FIG. 4B.

To sum up, in this embodiment of the present invention, when it is determined that a destination IP address is different from any IP address of a gateway to which a source virtual machine is attached, generation, according to an ARP request packet, a first MAC address forwarding table that is to be sent to the gateway is forbidden; and when it is determined that IP addresses of the gateway to which the source virtual machine is attached include an IP address that is the same as the destination IP address, the first MAC address forwarding table that is to be sent to the gateway is generated according to the ARP request packet, and the first MAC address forwarding table is sent to the gateway. Therefore, when it is determined that the gateway to which the source virtual machine is attached does not need to use the first MAC address forwarding table, there is no need to deliver the first MAC address forwarding table to the gateway to which the source virtual machine is attached, thereby improving utilization of storage resources of the gateway to which the source virtual machine is attached.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to embodiments of the present invention without departing from the scope of the embodiments of the present invention. The present invention is intended to cover these modifications and variations provided that they fall within the scope of protection defined by the following claims.

What is claimed is:

1. A method, comprising:
   receiving, by a software-defined networking (SDN) controller, an address resolution protocol (ARP) request packet sent by a source virtual machine using a first top-of-rack (TOR) switch to which the source virtual machine is attached, wherein the ARP request packet carries a destination Internet Protocol (IP) address; and
   when the SDN controller determines that the destination IP address is different from any IP address of a gateway associated with the source virtual machine, forbidding generation, according to the ARP request packet, of a media access control (MAC) address forwarding table, wherein when the MAC address forwarding table is generated the MAC address forwarding table is sent to the gateway to associated with the source virtual machine.

2. The method according to claim 1, wherein after receiving the ARP request packet, the method further comprises:
   determining, by the SDN controller, that a tunnel in which the source virtual machine interacts with a destination virtual machine corresponding to the destination IP address is a first tunnel between the first TOR switch and a second TOR switch to which the destination virtual machine is attached; and
   returning, by the SDN controller, a second MAC address forwarding table to the first TOR switch, wherein the second MAC address forwarding table carries a mapping relationship between a MAC address of the destination virtual machine and the first tunnel.

3. The method according to claim 1, wherein after receiving the ARP request packet, the method further comprises:
   when the SDN controller determines that IP addresses of the gateway associated with the source virtual machine comprises an IP address that is the same as the destination IP address, determining that a tunnel in which the source virtual machine interacts with a destination virtual machine corresponding to the destination IP address is a second tunnel between the first TOR switch and the gateway;
   generating, by the SDN controller, a first MAC address forwarding table according to the ARP request packet, wherein the first MAC address forwarding table comprises a mapping relationship between a MAC address of the source virtual machine and the second tunnel; and
   sending, by the SDN controller, the generated first MAC address forwarding table to the gateway.

4. The method according to claim 3, wherein the SDN controller determines that IP addresses of the gateway associated with the source virtual machine comprise an IP address that is the same as the destination IP address, and the method further comprises:
   returning, by the SDN controller, a second MAC address forwarding table to the first TOR switch, wherein the second MAC address forwarding table carries a mapping relationship between a MAC address of the gateway and the second tunnel.

5. A software-defined networking (SDN) controller, comprising:
   a receiving unit, configured to receive an address resolution protocol (ARP) request packet sent by a source virtual machine using a first top-of-rack (TOR) switch to which the source virtual machine is attached, wherein the ARP request packet carries a destination Internet Protocol (IP) address; and a determining unit, configured to: when determining that the destination IP address is different from any IP address of a gateway associated with the source virtual machine, forbid generation, according to the ARP request packet, a media access control (MAC) address forwarding table, wherein when the MAC address forwarding table is generated the MAC address forwarding table is sent to the gateway associated with the source virtual machine belongs.

6. The SDN controller according to claim 5, further comprising a first determining unit and a first sending unit, wherein the first determining unit is configured to determine that a tunnel in which the source virtual machine interacts with a destination virtual machine corresponding to the destination IP address is a first tunnel between the first TOR switch and a second TOR switch to which the destination virtual machine is attached; and wherein the first sending unit is configured to return a second MAC address forwarding table to the first TOR switch, wherein the second MAC address forwarding table carries a mapping relationship between a MAC address of the destination virtual machine and the first tunnel.

7. The SDN controller according to claim 5, further comprising:

a second determining unit, configured to:

when the determining unit determines that IP addresses of the gateway associated with the source virtual machine comprise an IP address that is the same as the destination IP address, determine that a tunnel in which the source virtual machine interacts with a destination virtual machine corresponding to the destination IP address is a second tunnel between the first TOR switch and the gateway; and generate a first MAC address forwarding table according to the ARP request packet, wherein the first MAC address forwarding table comprises a mapping relationship between a MAC address of the source virtual machine and the second tunnel; and a second sending unit, configured to send the generated first MAC address forwarding table to the gateway.

8. The SDN controller according to claim 7, wherein the second sending unit is further configured to return a second MAC address forwarding table to the first TOR switch, and the second MAC address forwarding table carries a mapping relationship between a MAC address of the gateway and the second tunnel.

9. A software-defined networking (SDN) control system, comprising the SDN controller according to claim 5.

10. A software-defined networking (SDN) controller, comprising:
a transceiver; and
a processor;

wherein the transceiver is configured to receive an address resolution protocol (ARP) request packet sent by a source virtual machine using a first top-of-rack (TOR) switch to which the source virtual machine is attached, wherein the ARP request packet carries a destination Internet Protocol (IP) address; and wherein the processor is configured to, when determining that the destination IP address is different from any IP address of a gateway associated with the source virtual machine, forbid generation, according to the ARP request packet, of a MAC address forwarding table, wherein when the MAC address forwarding table is generated the MAC address forwarding table is sent to the gateway associated with the source virtual machine.

11. The SDN controller according to claim 10, wherein the processor is further configured to determine that a tunnel in which the source virtual machine interacts with a destination virtual machine corresponding to the destination IP address is a first tunnel between the first TOR switch and a second TOR switch to which the destination virtual machine is attached; and wherein the transceiver is further configured to return a second MAC address forwarding table to the first TOR switch, wherein the second MAC address forwarding table carries a mapping relationship between a MAC address of the destination virtual machine and the first tunnel.

12. The SDN controller according to claim 10, wherein the processor is further configured to:

when determining that IP addresses of the gateway associated with the source virtual machine comprise an IP address that is the same as the destination IP address, determine that a tunnel in which the source virtual machine interacts with a destination virtual machine corresponding to the destination IP address is a second tunnel between the first TOR switch and the gateway; and generate a first MAC address forwarding table according to the ARP request packet, wherein the first MAC address forwarding table comprises a mapping relationship between a MAC address of the source virtual machine and the second tunnel; and wherein the SDN controller is further configured to send the generated first MAC address forwarding table to the gateway.

13. The SDN controller according to claim 12, wherein the transceiver is further configured to:

when the processor determines that IP addresses of the gateway associated with the source virtual machine comprise an IP address that is the same as the destination IP address, return a second MAC address forwarding table to the first TOR switch, wherein the second MAC address forwarding table carries a mapping relationship between a MAC address of the gateway and the second tunnel.

* * * * *